US012435836B2

(12) United States Patent
Mallick et al.

(10) Patent No.: US 12,435,836 B2
(45) Date of Patent: Oct. 7, 2025

(54) COMPOSITE-OVERWRAPPED PRESSURE VESSEL SYSTEM

(71) Applicant: Verne Inc., San Francisco, CA (US)

(72) Inventors: Kaushik Mallick, San Francisco, CA (US); David E. Jaramillo, San Francisco, CA (US)

(73) Assignee: Verne Inc., San Francisco, CA (US)

( * ) Notice: Subject to any disclaimer, the term of this patent is extended or adjusted under 35 U.S.C. 154(b) by 0 days.

(21) Appl. No.: 18/916,032

(22) Filed: Oct. 15, 2024

(65) Prior Publication Data

US 2025/0122976 A1  Apr. 17, 2025

Related U.S. Application Data

(60) Provisional application No. 63/589,961, filed on Oct. 12, 2023.

(51) Int. Cl.
| | |
|---|---|
| F17C 1/12 | (2006.01) |
| C22C 21/16 | (2006.01) |
| F17C 1/02 | (2006.01) |
| F17C 1/14 | (2006.01) |

(52) U.S. Cl.
CPC .............. *F17C 1/12* (2013.01); *F17C 1/02* (2013.01); *F17C 1/14* (2013.01); *C22C 21/16* (2013.01); *F17C 2203/0604* (2013.01); *F17C 2203/0648* (2013.01); *F17C 2223/0123* (2013.01); *F17C 2223/036* (2013.01)

(58) Field of Classification Search
CPC ....... F17C 2203/0646; F17C 2223/036; Y10T 428/13–1397

USPC ...... 220/560.04, 560.09, 560.1, 560.12, 581, 220/586, 588, 589, 901; 428/34.1–36.92
See application file for complete search history.

(56) References Cited

U.S. PATENT DOCUMENTS

| | | | | |
|---|---|---|---|---|
| 2,042,426 A | * | 5/1936 | Kinzel | F17C 3/10 206/583 |
| 3,414,406 A | * | 12/1968 | Doyle | C22C 21/00 148/703 |
| 3,696,959 A | * | 10/1972 | Eifel | F17C 13/086 220/901 |
| 3,773,168 A | * | 11/1973 | Meinass | B65B 15/04 220/88.1 |
| 4,011,963 A | | 3/1977 | Cheng et al. | |

(Continued)

FOREIGN PATENT DOCUMENTS

| | | | | | |
|---|---|---|---|---|---|
| CN | 112097095 A | * | 12/2020 | | F17C 1/06 |
| GB | 1483758 | * | 7/1974 | | F17C 1/14 |

(Continued)

*Primary Examiner* — Michael C Romanowski
(74) *Attorney, Agent, or Firm* — Jeffrey Schox; Evan Myers (57) ABSTRACT

The pressure vessel system can include a pressure vessel and an optional jacket. However, the system 100 can additionally or alternatively include any other suitable set of components. The pressure vessel can include a liner, an optional composite overwrap, and/or any other suitable components. For example, the pressure vessel can be a composite overwrapped pressure vessel (COPV) with a metallic liner (e.g., alloyed aluminum). The pressure vessel system can function to store fluid (e.g., cryo-compressed hydrogen) within an interior chamber.

20 Claims, 8 Drawing Sheets

Comparison of mechanical properties at 77K selected for liner material against the incumbent material (6061-T6)

(56) References Cited

U.S. PATENT DOCUMENTS

| | | | | |
|---|---|---|---|---|
| 4,023,696 | A * | 5/1977 | Anagnostidis | B21D 51/24 |
| | | | | 148/417 |
| 4,461,398 | A * | 7/1984 | Argy | F17C 13/001 |
| | | | | 52/249 |
| 4,747,890 | A * | 5/1988 | Meyer | C22C 21/10 |
| | | | | 148/439 |
| 5,085,343 | A * | 2/1992 | Scarr | F02K 9/605 |
| | | | | 220/636 |
| 5,385,263 | A * | 1/1995 | Kirk | F17C 1/16 |
| | | | | 206/443 |
| 5,964,117 | A * | 10/1999 | Holroyd | B21C 23/20 |
| | | | | 72/379.4 |
| 6,401,963 | B1 | 6/2002 | Seal et al. | |
| 6,708,502 | B1 | 3/2004 | Aceves et al. | |
| 2002/0046567 | A1 | 4/2002 | Pelloux-Gervais et al. | |
| 2005/0284552 | A1 * | 12/2005 | Sankaran | C22F 1/04 |
| | | | | 148/698 |
| 2007/0289974 | A1 * | 12/2007 | Blair | F17C 13/001 |
| | | | | 220/560.15 |
| 2009/0283176 | A1 | 11/2009 | Berry et al. | |
| 2011/0302933 | A1 * | 12/2011 | Immel | F17C 3/00 |
| | | | | 62/51.1 |
| 2013/0164170 | A1 * | 6/2013 | Nakai | C22C 21/06 |
| | | | | 420/532 |
| 2015/0267866 | A1 * | 9/2015 | Varrassi | F17C 1/12 |
| | | | | 220/560.11 |
| 2016/0109065 | A1 * | 4/2016 | Coors | F17C 1/00 |
| | | | | 156/185 |
| 2018/0356040 | A1 | 12/2018 | Gillia et al. | |
| 2019/0126349 | A1 * | 5/2019 | Sherman | B21D 3/00 |
| 2022/0170597 | A1 | 6/2022 | Saha et al. | |
| 2023/0039589 | A1 * | 2/2023 | Chao | C22C 1/04 |
| 2023/0062841 | A1 * | 3/2023 | Sardou | F17C 1/14 |
| 2023/0392551 | A1 * | 12/2023 | Minas | F02C 9/40 |

FOREIGN PATENT DOCUMENTS

| | | | | |
|---|---|---|---|---|
| WO | WO-2011107260 | A1 * | 9/2011 | F17C 1/00 |
| WO | 2022150474 | A1 | 7/2022 | |
| WO | 2024020003 | A1 | 1/2024 | |

* cited by examiner

Distinct regimes of fatigue crack growth rate with the steady-state Paris Region.

Comparison of mechanical properties at 77K selected for liner material against the incumbent material (6061-T6)

FIGURE 8

Target fatigue crack growth regime

FIGURE 9

COMPOSITE-OVERWRAPPED PRESSURE VESSEL SYSTEM

CROSS REFERENCE TO RELATED APPLICATIONS

This application claims the benefit of U.S. Provisional Application No. 63/589,961, filed 12 Oct. 2023, which is incorporated herein in its entirety by this reference.

TECHNICAL FIELD

This invention relates generally to the storage vessels field, and more specifically to a new and useful composite-overwrapped pressure vessel system and/or method in the storage vessels field.

BACKGROUND OF THE INTENTION

The use of hydrogen as a fuel source has garnered significant interest due to its potential as a clean and renewable energy solution. In the transportation sector, such as hydrogen-powered trucking, there are two common on-board compressed hydrogen storage technologies: plastic-lined Type IV pressure vessels and 6061-T6 aluminum-lined Type III pressure vessels. These technologies were designed and built to store pressurized gaseous hydrogen at ambient temperature. Type IV pressure vessels typically store hydrogen at 300 K and 700 bar, containing an internal hydrogen density of 39 g/L, and Type III pressure vessels typically store hydrogen at 300 K and 350 bar, containing an internal hydrogen density of 24 g/L. These storage densities are insufficient for broader industry adoption, and a system for higher hydrogen storage density system is needed.

Cryo-compressed hydrogen ($CcH_2$) exhibits hydrogen densities of 73 g/L (at 350 bar and 58 K), which is 60% greater density than 700 bar and even greater than liquid hydrogen densities (59 g/L at 6 bar). Since, cryo-compressed hydrogen is both cryogenic and compressed, typically at around 60 K and 350 bar, $CcH_2$ storage systems and constituent materials may encounter repeated cycles of cryo-temperature and high pressures.

Cryo-compressed hydrogen storage poses challenges for existing pressure vessels, such as the commercially available Type IV or Type III. For instance, plastic liners typically used in Type IV vessels exhibit good ductility at ambient temperature, but the operating temperature required for $CcH_2$ storage is well below the glass transition temperature of the plastic liners. As a result, the plastic liners become brittle under exposure to cryo-compressed hydrogen storage, rendering them inadequate to function as a permeation barrier. Aluminum alloys of liners typically used in Type III pressure vessels will not face the same brittleness issues of the plastic liner at cryogenic temperatures. Compared to the plastic liners of Type IV vessels, the conventional Type III liner materials may exhibit improved mechanical and permeation barrier properties when operating at cryogenic temperatures. However, the unique operating conditions of cryo-compressed hydrogen storage, which involve both pressure cycles and temperature swings, introduces additional challenges. This combination leads to a different stress profile than just introducing pressure stress or just introducing cryogenic temperature, which influences the cyclic life of the liner material. Therefore, there is a need to develop a liner to improve cyclic performance under $CcH_2$ operating conditions.

The limitations of the existing hydrogen storage technologies and the lack of suitable materials for cryo-compressed hydrogen storage highlight the need for further advancements in this field. Thus, there is a need in the storage vessel field to create a new and useful system and method for a composite-overwrapped pressure vessel system for cryo-compressed hydrogen applications. This invention provides such a new and useful system and method.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview.

Figure 1:
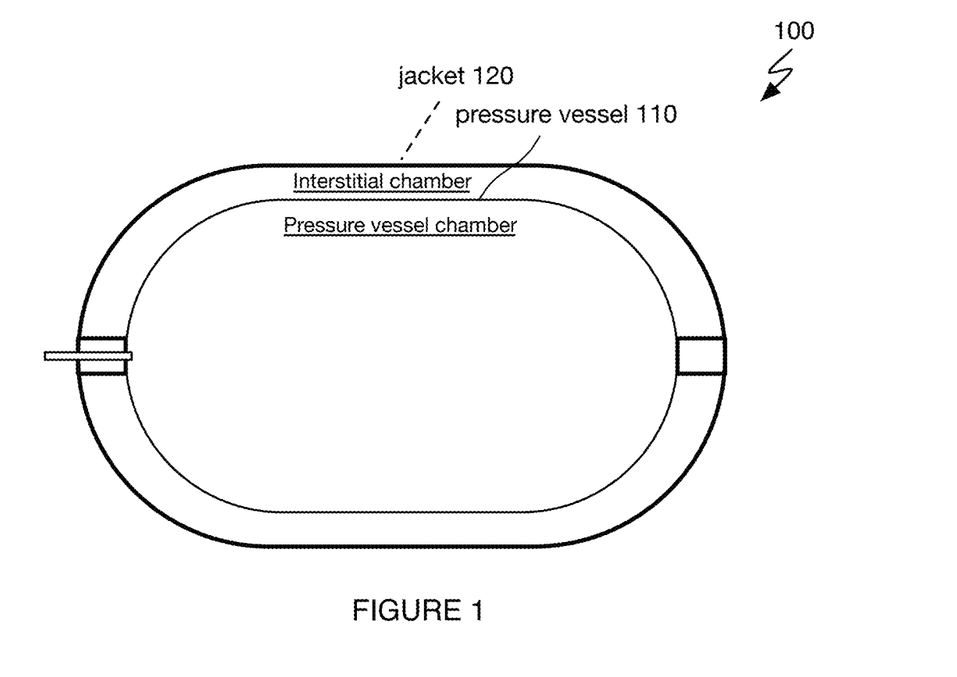
FIG. 1 is a schematic representation of a variant of the system.

The pressure vessel system 100, an example of which is shown in FIG. 1, can include: a pressure vessel and an optional jacket. The pressure vessel can function to store fluid (e.g., cryo-compressed hydrogen) within an interior chamber. Additionally, the system can function to fluidly isolate a chamber (e.g., interstitial vacuum chamber) between the jacket and the pressure vessel from the interior chamber of the pressure vessel (e.g., cryo-compressed hydrogen storage chamber). However, the system 100 can additionally or alternatively include any other suitable set of components.

Figure 2:
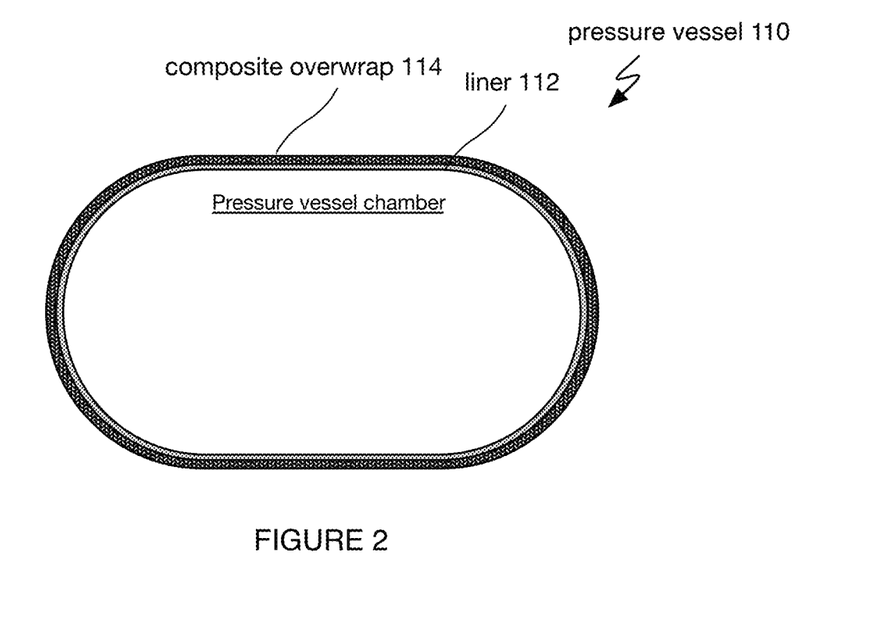
FIG. 2 is a schematic representation of a variant of the system

The pressure vessel, an example of which is shown in FIG. 2, can include (or may be constructed with) a liner and an optional composite-overwrap. For example, the pressure vessel can be a composite-overwrapped pressure vessel (COPV) with a metallic liner (e.g., aluminum alloy).

The pressure vessel system and methods can enable a number of performance improvements and optimizations over traditional storage vessels, like a traditional Type III pressure vessel, for the demanding operating conditions of $CcH_2$ (e.g., cryogenic and compressed).

In particular, the systems and methods may employ a liner (e.g., aluminum alloy) with material properties described herein, which may improve performance and satisfy design objectives that may be of high value for commercially viable $CcH_2$ storage applications in heavy-duty transport. In some variations, the liner can provide high cycle life under cryogenic and high-pressure operating conditions (e.g., of CcH$_2$ applications). For instance, the cycle count (e.g., for pressurization and depressurization/evacuation using cryogenic hydrogen) can be greater than 10,000, but may also be greater than 20,000 for example. Variants can enable this with a thin liner (e.g., thickness between 0.05 inches and 0.5 inches, thickness less than 0.5 inches, thickness less than 0.25 inches, thickness less than 0.125 inches, etc.) to reduce system weight and increase volumetric efficiency, which may be particularly advantageous in transportation applications. Additionally, variants may additionally or alternatively serve to achieve high overall gravimetric efficiency (e.g., 10 wt. % or 3.3 kWh/kg at the system level) and volumetric hydrogen storage density (e.g. 50 g/L or 1.7 kWh/L at the system level), which may be of further advantage for on-board vehicle storage.

Additionally, variants of the pressure vessel system can include a double-walled pressure vessel system, which may advantageously increase insulation to maintain cryogenic temperatures and storage life, while also satisfying the desired material performance. For instance, the vessel can include a fixed outer wall (e.g., an insulation layer) and a COPV, within the fixed outer wall, which forms an inner wall of the double walled pressure vessel system, with an interstitial vacuum space between the fixed outer wall and the COPV. The COPV can be configured to expand within the fixed outer wall as a function of internal pressure and temperature, while constrained relative to the outer wall (and containing a pressurized fluid, such as cryo-compressed hydrogen). In a first example, the COPV can include a liner formed with a non-weldable aluminum alloy with a carbon fiber composite overwrap structure. In a second example, the composite overwrapped pressure vessel (COPV) can include: a liner formed as a unitary body from an alloy, the alloy comprising: between 92.0% and 96.8% aluminum by mass, between 2.0% and 6.5% copper by mass, between 0.2% and 0.5% manganese by mass; and a composite overwrap surrounding the liner. In at least one variation, the alloy comprises: between 92.0% and 96.8% aluminum by mass, between 2.0% and 6.5% copper by mass, and between 0.2% and 0.5% manganese by mass. In at least one variation, the alloy comprises between 3.2% and 6.3% copper by mass. In at least one variation, the alloy comprises between 0.2% and 0.6% magnesium by mass. In at least one variation, the metal alloy comprises between 0.2% and 0.5% manganese by mass.

The term "substantially" as utilized herein can mean: exactly, approximately, within a predetermined threshold or tolerance, and/or have any other suitable meaning.

1.1 Variants.

In a first variant, a cryo-compression vessel comprises: an insulation layer; and a composite overwrapped pressure vessel (COPV) encapsulated within the insulation layer and at least partially separated from the insulation layer by an interstitial gas chamber, the COPV comprising: a liner comprising a cylinder with a pair of ellipsoidal end caps formed as a unitary body from a metal alloy, the metal alloy comprising: greater than 92.0% aluminum by mass, greater than 2.0% copper by mass, greater than 0.2% manganese by mass, and less than 0.6% magnesium by mass; and a composite overwrap structure encapsulating the metal liner.

In one example of the first variant, the metal alloy comprises: between 92.0% and 96.8% aluminum by mass, between 2.0% and 6.5% copper by mass, and between 0.2% and 0.5% manganese by mass. In one variation, the metal alloy comprises between 3.2% and 6.3% copper by mass. Additionally, the metal alloy can comprise between 0.2% and 0.6% magnesium by mass.

In one example of the first variant, the metal alloy comprises between 0.2% and 0.5% manganese by mass.

In one example of the first variant, the metal alloy is an aluminum-copper alloy.

In one example of the first variant, the composite overwrap structure comprises carbon fiber. In one variation, the composite overwrap structure has a thickness between 0.125 inches and 2 inches, and the liner has a thickness between 0.05 inches and 0.5 inches. In a second variation, nonexclusive with the first, at 77K, an elastic modulus of the liner is less than an elastic modulus of the composite overwrap structure.

In one example of the first variant, the COPV is configured to house hydrogen gas at 350 bar with the interstitial gas chamber at a vacuum pressure.

In one example of the first variant, the unitary body comprises a cylinder with a pair of domed ends, wherein the cylinder comprises a Length-over-Diameter (L/D) ratio between 1.5 and 5.

In one example of the first variant, the liner is fluidly coupled to a pressurized interior of the COPV.

In one example of the first variant, the insulation layer comprises a structural enclosure and is substantially rigid, wherein the COPV is mechanically coupled to the structural enclosure.

In one example of the first variant, the unitary body is spin formed or flow formed.

In a second variant, nonexclusive with the first, a composite overwrapped pressure vessel (COPV) comprises: a liner formed as a unitary body from an alloy, the alloy comprising: between 92.0% and 96.8% aluminum by mass, between 2.0% and 6.5% copper by mass, between 0.2% and 0.5% manganese by mass; and a composite overwrap surrounding the liner.

In one example of the second variant, the alloy further comprises magnesium.

In one example of the second variant, at 77 Kelvin, the alloy defines a fatigue crack growth rate exponent of less than 3.25 inches per cycle within a linear elastic crack growth regime. In one variation, the linear elastic crack growth regime is between the stress intensity factor (K) range defined by: 3 ksi$\sqrt{\text{in}}$<DK<30 ksi$\sqrt{\text{in}}$. In one variation, the alloy defines a yield strength above 50 ksi, and a strain to failure above 15 percent.

In one example of the second variant, the alloy is pretreated by a T6 Heat Treatment Process.

2. Benefits.

Variations of the technology can afford several benefits and/or advantages.

First, variations of this technology can provide improved storage vessels uniquely enhanced for CcH$_2$ or other fluids with similar cryogenic or compression conditions.

Second, variations of this technology can provide a storage solution for CcH$_2$ with improved cycle life under cryogenic and high-pressure cycles. Additionally, variants can improve overall gravimetric and volumetric energy storage density (e.g., when compared to liquid hydrogen at cryogenic temperatures and compressed hydrogen gas at ambient temperatures). Such systems can increase hydrogen storage viability in various use cases, such as on-board storage for aviation or commercial roadway transportation, where greater gravimetric and volumetric energy storage density is particularly advantageous.

Third, variations of this technology can provide a storage vessel that is lower mass while exhibiting higher durability relative to previous storage vessel solutions.

Fourth, variations of this technology can facilitate the structural support of a variable geometry vessel (e.g., COPV) within a multi-layer insulation (MLI) vessel (e.g., double walled vessel) to improve thermal performance, insulation, and storage life.

However, variations of the technology can additionally or alternately provide any other suitable benefits and/or advantages.

3. System.

The pressure vessel system 100, an example of which is shown in FIG. 1, can include: a pressure vessel 110 and an optional jacket 120. The pressure vessel can function to store fluid (e.g., cryo-compressed hydrogen) within an interior chamber. Additionally, the system can function to fluidly isolate a chamber (e.g., interstitial vacuum chamber) between the jacket and the pressure vessel from the interior chamber of the pressure vessel (e.g., cryo-compressed hydrogen storage chamber).

The pressure vessel 110 functions to enclose and/or house a fluid medium, such as cryo-compressed hydrogen, within an interior chamber. Additionally or alternatively, the pressure vessel can function to substantially fluidly isolate the interior chamber of the pressure vessel from a second (interstitial) chamber and/or a fluid medium stored therein (i.e., interstitial vacuum air gap).

Figure 3:
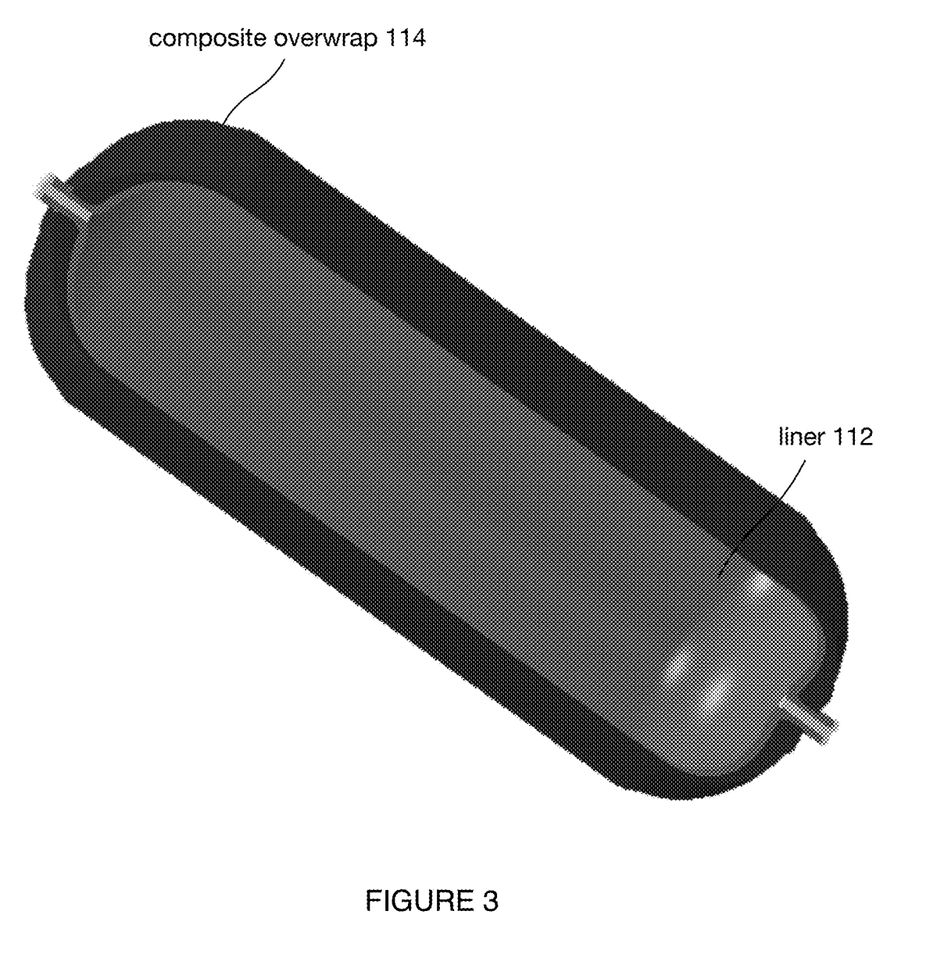
FIG. 3 is a schematic representation of a composite overwrapped pressure vessel (COPV) variation.

The optional jacket 120 functions to enclose the pressure vessel and/or (partially) thermally insulate the pressure vessel from an exterior environment (e.g., substantially thermally isolating the pressure vessel from the exterior environment). Additionally, the jacket can function to (substantially) fluidly isolate an interstitial chamber from an exterior environment. For example, the jacket interior can enclose and fluidly isolate interstitial space between the jacket and the pressure vessel. More preferably, the jacket can be substantially rigid, static, nondeformable, and/or size invariant under nominal operating conditions (e.g., geometry is independent of fluid medium temperature and/or pressure; nonexpandable fluid vessel) and configured to maintain negative pressure within the interstitial chamber (e.g., relative to ambient and/or exterior pressure; partial vacuum). For example, the jacket can be configured to fluidly isolate an interstitial space (a.k.a., first chamber) between the jacket and the pressure vessel, with a pressure less than: 1 bar, 0.1 bar, 0.05 bar, 0.02 bar, 0.01 bar, 0.005 bar, 0.001 bar, 0.0001 bar, 0.0005 bar, 0.00001 bar, any open or closed range bounded by the aforementioned values, and/or any other suitable pressure(s). Alternatively, the first chamber can be pressurized (e.g., with inert gas), unpressurized (e.g., at atmospheric pressure; selectively fluidly coupled to atmospheric pressure, etc.), and/or can have any other suitable pressure (and/or vacuum pressure). The jacket can include any suitable materials and/or layers, such as: metals (e.g., stainless steel, titanium, aluminum, etc.; alloyed, non-alloyed; etc.), composites (e.g., fiberglass, carbon fiber, etc.), polymers (e.g., HDPE, PEEK, PMI, Nylon, etc.), thermoset layers/coatings, thermoplastics, aerogel, foam, MLI layers, and/or any other suitable material(s) and/or layer(s). The jacket and/or layers thereof can be formed as a unitary, contiguous body (e.g., unibody composite, weldment enclosure, etc.) and/or can include an assembly of multiple (e.g., exterior) layers, reinforcing structures, and/or insulation (e.g., external foam insulation, peripheral mounts, etc.). As an example, the outer jacket can include a stainless-steel enclosure (e.g., cylinder with domed ends, etc.). As a second example, the outer jacket can include an aluminum weldment (e.g., weldable alloys within Al-5000 series, Al-6000 series, etc.). The jacket can enclose and/or mechanically couple to exactly one pressure vessel (e.g., such as forming a double-walled cylinder) and/or multiple inner pressure vessels. The jacket geometry can be substantially similar to the pressure vessel (e.g., nested, concentric cylinders) or different (e.g., slightly different L/D ratio, etc.). The jacket can be cylindrical, prismatic, domed/capped (e.g., hemispherical ends, bowed at the ends), ellipsoidal (e.g., prolate, oblate, etc.), spherical, semi-spherical, and/or can have any other suitable geometry/features. Additionally, the jacket is preferably mechanically coupled to the pressure vessel and configured to structurally support the pressure vessel and/or neck of the pressure vessel. An example of a COPV pressure vessel is shown in FIG. 3.

In variants, the jacket materials can be selected to reduce outgassing within the first chamber. For example, the jacket can include a rolled stainless-steel cylinder with welded, domed end caps (e.g., partially spherical, hemispherical, ellipsoidal, etc.).

In variants, the jacket can include or be used with the outer jacket, insulation layers, MLI structures, and/or any other suitable set of elements as described in U.S. application Ser. No. 18/689,028, filed 4 Mar. 2024, titled "COMPACT INSERTS FOR CRYO-COMPRESSED STORAGE VESSELS", and/or International Application Serial No. PCT/US2023/027986, filed 18 Jul. 2023, titled "SYSTEM AND METHOD FOR MULTI-TANK CRYO-COMPRESSED HYDROGEN STORAGE AND OPERATION", each of which is incorporated herein in its entirety by this reference.

However, the system can include any other suitable jacket(s) and/or MLI enclosure(s).

The (interior) pressure vessel can include a liner 112 and an optional composite overwrap 114. For example, the pressure vessel can be a composite overwrapped pressure vessel (COPV) with a metallic liner (e.g., alloyed aluminum). The pressure vessel functions to enclose and/or house a fluid medium, such as cryo-compressed hydrogen, within an interior chamber.

The pressure vessel is preferably cylindrical, but can additionally or alternatively be ellipsoidal and/or can include domed/capped ends. The ends of the pressure vessel can be isotensoidal, hemispherical, ellipsoidal, bowed/domed, and/or can have any other suitable geometry. Additionally, the Length-over-Diameter (L/D) ratio of the pressure vessel (and/or liner thereof) can be: less than 1, 1, 1.5, 2, 3, 4, 5, 7, greater than 7, any open or closed range bounded by the aforementioned values, and/or any other suitable geometry. More preferably, the L/D ratio of the pressure vessel is between 1.5 and 5, which may be particularly advantageous for structural mounting within the jacket (e.g., relative expansion of the pressure vessel with respect to the jacket may increase at high L/D ratios, increasing the necessary air gap as a fraction of diameter and reducing effective storage density; both high and low L/D ratios may pose greater structural challenges under thermal expansion outside of L/D ratios of 1.5 to 5). In one preferred example, the L/D ratio of the pressure vessel is about 3 (e.g., within 10%), which may be preferred for balancing density benefits and cyclic structural integrity in a roadway vehicle setting. In a second preferred example, the L/D ratio of the pressure vessel is about 4 (e.g., within 15%), which may be preferred for packaging in some aviation contexts (e.g., where reducing diametric footprint may be advantageous). In a third preferred example, an L/D ratio between 2 and 4 may be most advantageous in terms of manufacturability (e.g., where cylinder length manufacturing may pose various practical challenges at greater lengths). However, the pressure vessel can have any other suitable geometry/structure.

The pressure vessel is preferably configured to be neck-mounted (e.g., supported at opposing ends, such as opposite domed ends of a pressure vessel cylinder along the central axis of the cylinder) but can additionally or alternatively be base-mounted, side-mounted (e.g., supported along the outer wall/diameter), and/or configured to be otherwise suitably mounted/supported by the set of supports in any other arrangement(s). In variants, the inner tank can include the tank, insert(s), and/or any other suitable element(s) as described in U.S. application Ser. No. 18/689,028, filed 4 Mar. 2024, titled "COMPACT INSERTS FOR CRYO-COMPRESSED STORAGE VESSELS", and/or International Application Serial No. PCT/US2023/027986, filed 18 Jul. 2023, titled "SYSTEM AND METHOD FOR MULTI-TANK CRYO-COMPRESSED HYDROGEN STORAGE AND OPERATION", each of which is incorporated herein in its entirety by this reference.

The pressure vessel preferably includes a Composite Overwrapped Pressure Vessel (COPV), but can additionally or alternatively include: an expandable pressure vessel, thin-walled pressure vessel (e.g., flexible-walled pressure vessel, semi-rigid, variable geometry, etc.), full-metal pressure vessel (e.g., liner prior to application of the overwrap), hoop-wrapped pressure vessel, fully-wrapped pressure vessel (e.g., metal-lined), and/or any other suitable pressure vessel. Additionally, the pressure vessel can optionally include one or more insulating layers/coatings, such as: paint, epoxy, thermal barrier coatings (TBCs), metals, polymers, composites (e.g., fiberglass, carbon fiber, synthetic fiber, aramid fiber, Kevlar®, etc.), thermoplastics, thermoset materials, and/or any other suitable material(s)/layer(s).

However, the pressure vessel can be of any other suitable construction.

The composite overwrap 114 envelops the liner 112 and functions to structurally reinforce the liner and the pressure vessel (e.g., COPV technology). For example, a carbon fiber composite layer can be overwrapped over the liner (e.g., metal alloy). The composite overwrap is preferably a carbon fiber composite (e.g., carbon fiber embedded in an epoxy matrix), but can additionally include any suitable composites (e.g., fiberglass, carbon fiber, synthetic fiber, aramid fiber, Kevlar®, etc.), thermoplastics, thermoset materials, and/or any other suitable material(s)/layer(s). Additionally, the overwrap can include any suitable insulating layers or materials, such as: paint, epoxy, thermal barrier coatings (TBCs), metals, polymers, and/or any other suitable materials. The thickness of the composite overwrap can be less than 0.25 inches, 0.25 inches, 0.5 inches, 0.75 inches, 1 inch, 1.5 inches, 2 inches, greater than 2 inches, any open or closed range bounded by the aforementioned values, and/or any other suitable thickness.

However, the pressure vessel can include any other suitable composite overwrap, and/or can otherwise exclude a composite overwrap in some configurations.

The liner 112 functions to retain a pressurized fluid medium (e.g., cryo-compressed hydrogen at about 60 K and about 350 bar). Additionally or alternatively, the liner functions to form a body structure of the COPV, prior to application of the composite overwrap.

The liner is preferably a unitary body formed with metal and/or a metal alloy. More preferably, the liner is formed by seamless construction (e.g., spin formed or flow formed; without welds or weld seams), which may reduce stress concentrations and eliminate the potential for crack propagation from weld seams (e.g., which may be particularly detrimental to cycle life when operating with cryo-compressed fluids). Additionally, the liner may have an equiaxed grain (e.g., promoted by controlled cooling or solidification), which may be beneficial to reduce crack formation/propagation, and/or may have any other suitable heat treatment properties. For instance, the liner material may be heat treated (e.g., T6 heat treatment designation), and/or may have any other suitable material treatments/processing. Additionally or alternatively, the liner can be integrated with other components by brazing, welding, bonding, and/or other suitable processes. However, the liner can be otherwise formed.

The liner preferably has substantially the same geometry and L/D as the pressure vessel (e.g., cylindrical with domed endcaps, defining the structural shape of the COPV), but can alternatively be different. The liner can have a thickness of less than 0.0025 inches, 0.0025 inches, 0.05 inches, 0.07 inches, 0.1 inch, 0.25 inches, 0.375 inches, 0.5 inches, greater than 0.5 inches, any open or closed range bounded by the aforementioned values, and/or any other suitable thickness. More preferably, the liner is thin walled with a thickness between 0.05 and 0.5 inches, which may facilitate thermal expansion and contraction of the COPV as a function of temperature (e.g., without incurring large stress concentrations and/or excess fatigue cracking over many cycles).

The material of the liner be selected to have any suitable set of material properties, including: fatigue crack growth rate (FCGR), weldability, ductility, yield strength, fatigue properties, threshold $\Delta K$, and/or any other suitable material properties. Additionally or alternatively, the liner material properties and geometry may yield failure locations inside the overwrap structure. For example, with favorable composite structures (e.g., carbon fiber composite overwrap), the liner preferably defines a fatigue crack growth rate exponent of less than 3.25 inches per cycle within a linear elastic fracture regime (e.g., wherein the linear elastic fracture regime is between the stress intensity factor (K) range defined by: 3 ksi$\sqrt{\text{in}}$<$\Delta K$<30 ksi$\sqrt{\text{in}}$). Additionally or alternatively, the liner preferably defines a yield strength above 50 ksi and a strain to failure above 15 percent. More preferably, the liner is more ductile than the overwrap and exhibits favorable fatigue properties within the window of cyclic loading (e.g., at cryogenic temperatures and operating pressures).

In a first variant, the material of the liner can be an aluminum alloy. For example, the liner alloy can include an aluminum mass percentage of: 90.0%, 91.0%, 92.0%, 92.2%, 92.4%, 92.5%, 92.6%, 93.0%, 93.4%, 93.5%, 95.6%, 96.4%, 96.6%, 96.7%, 96.8%, 97.0%, 97.6%, 98.0%, greater than 98.0%, any open or closed range bounded by the aforementioned values, and/or any other suitable mass percentage. In a first preferred variation, the aluminum mass percentage can be above 92.0% (e.g., such aluminum alloys may yield the favorable liner FCGR properties, particularly in combination with other alloyed metals, as addressed below). In a second preferred variation, the aluminum mass percentage can be between 92.0% and 96.8%.

In particular, copper alloyed with aluminum may improve the strength properties at the expense of weldability (e.g., which may be an insignificant tradeoff where the liner body is spin formed or flow formed; copper alloys above 0.3% typically considered non-weldable) and thermal properties (e.g., particularly at cryogenic temperatures). As an example, 2000-series alloys (e.g., duraluminum) and/or copper alloys with copper mass fractions above about 2.0% may provide favorable strength, ductility, and/or thermal properties (e.g., at cryogenic pressures). The aluminum alloy can include aluminum alloyed with a copper mass percentage of: less than 0.3%, 0.3%, 2.0%, 3%, 3.2%, 3.5%, 3.9%, 4.0%, 5.0%, 6.3%, 6.5%, greater than 6.5%, any open or closed range bounded by the aforementioned values, and/or any other suitable mass percentage. More specifically, the preferred copper mass percentage between 3.0% and 6.5% may be most favorable in the optimization for cyclic performance (e.g., combined optimization of FCGR properties within the linear elastic fatigue crack growth regime). However, the alloy can include any other suitable mass percentage of copper, and/or copper may be altogether excluded in some variations.

Additionally, manganese can be added in some variations, which may additionally improve the strength and/or corrosive properties of the alloy (e.g., corrosion may be otherwise problematic in some aluminum-copper alloys). The aluminum alloy can include a manganese mass percentage of: less than 0.2%, 0.2%, 0.3%, 0.4%, 0.5%, 0.6%, 1.0%, 1.2%, greater than 1.2%, any open or closed range bounded by the aforementioned values, and/or any other suitable mass percentage. More specifically, the preferred manganese mass fraction of 0.2% to 0.5% may be most favorable in the optimization for cyclic performance. In particular, the addition of manganese to the liner alloy (e.g., mass fractions between 0.2% to 0.5%) may achieve the desired FCGR properties (e.g., exponent of less than 3.25 inches per cycle within a linear elastic fatigue crack growth regime) and/or yield strength (e.g., above 50 ksi).

However, the alloy can include any other suitable mass fraction of manganese, and/or manganese may be altogether excluded in some variations.

Additionally, magnesium can be added in some variations, which may additionally improve the strength properties of the alloy and strain elongation at break. The aluminum alloy can include a magnesium mass percentage of: zero, less than 0.2%, 0.2%, 0.3%, 0.4%, 0.5%, 0.6%, 1.2%, 2.0%, 3.9%, 4.0%, 4.9%, 5.0%, greater than 5.0%, any open or closed range bounded by the aforementioned values, and/or any other suitable mass percentage. More specifically, the preferred manganese mass fraction of 0% to 0.6% may be most favorable in the optimization for cyclic performance. In particular, the addition of magnesium to the liner alloy (e.g., at mass fractions less than 0.6%) may achieve the desired ductility and yield strength (e.g., a strain to failure above 15 percent; yield strength above 50 ksi). However, the alloy can include any other suitable mass fraction of magnesium, and/or magnesium may be altogether excluded in some variations.

Additionally, the aluminum alloy can additionally include: iron, nickel, silicon, chromium, lithium, titanium, silver, vanadium, zinc, zirconium, bismuth, lead, and/or any other suitable alloyed metals or residuals.

In a second variant, the liner can be formed with an austenitic stainless-steel alloy.

In a third variant, the liner can be formed with a 6061-aluminum alloy (e.g., 6061-T6).

However, the system can include any other suitable liner and/or liner materials.

However, the system can include any other suitable components.

4. Design Properties and Methodology.

Figure 4:
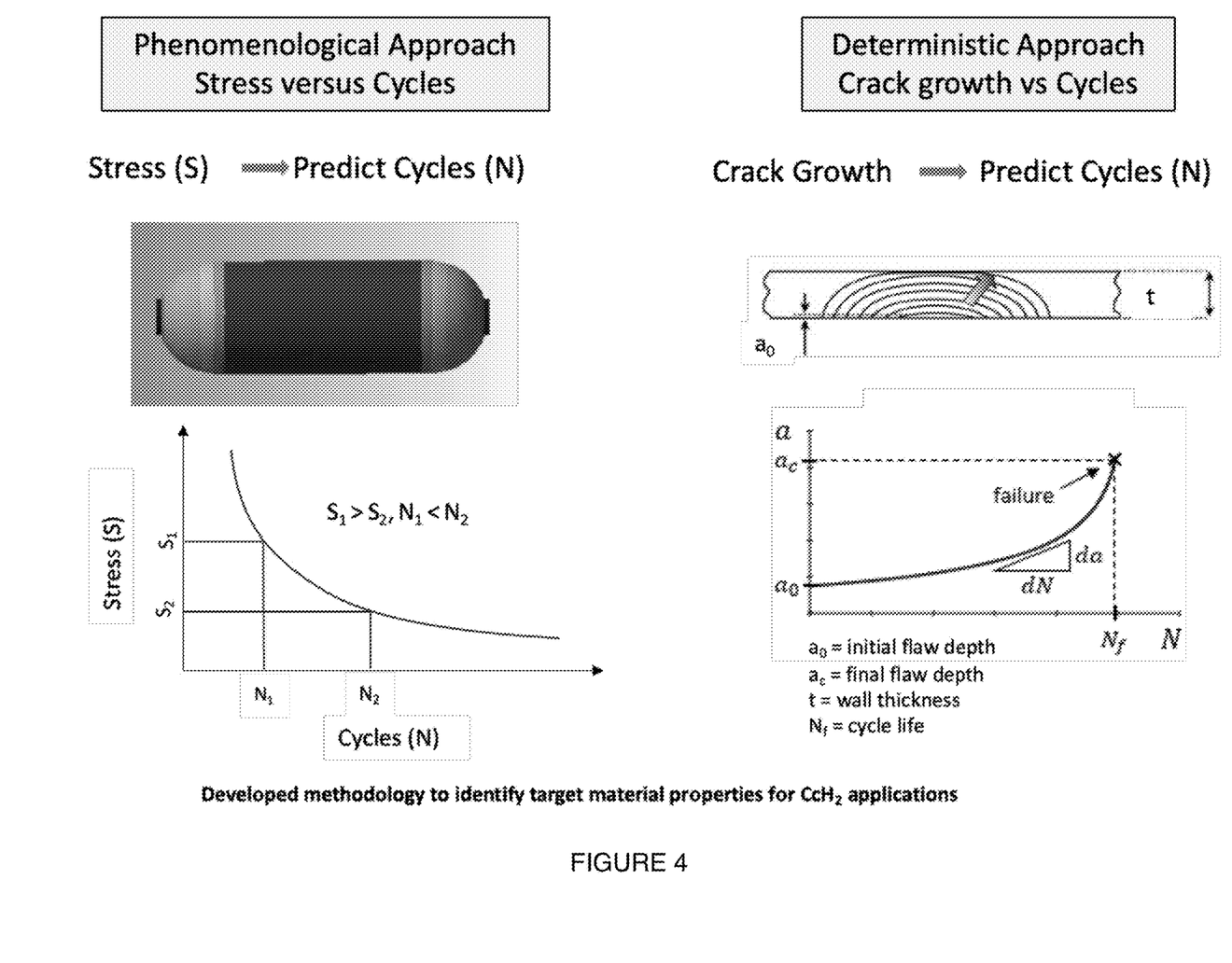
FIG. 4 is a diagram representation comparing the modeling approach applied for the systems and methods.

The system design methodology employed an integrated predictive design approach using semi-empirical tools as opposed to prior methodology which relied on stress vs. cycles or S-N curves as shown in the comparative figure of FIG. 4. The systems and methods uniquely adapted damage-tolerant modeling to operating conditions of cryo-compressed hydrogen. This modeling was used in predicting fatigue life for commercially relevant cryo-compressed hydrogen operating conditions. By implementing this approach, failure scenarios may be predictable within a given confidence interval, assuming flaw size, temperature levels, pressure levels, and bounded material properties (e.g., fatigue crack growth characteristics of the liner). Overall, this methodology allows specification and/or identification of the combination of material properties of an alloy to meet certain cryo-compressed hydrogen performance metrics, such as cycle life experienced before a leak-before-burst failure of the storage vessel. Accordingly, the liner system and material identification (e.g., as addressed above) which meets these design constraints can improve the cyclic performance of storage vessels under the operating conditions of cryo-compressed hydrogen.

The pressure vessel may be a lightweight pressure vessel and as discussed can be used for storing cryogenic hydrogen but may alternatively be used for storage of materials.

In some variations, the liner may substantially form a body of the pressure vessel. Accordingly, in some variations, the liner by itself may serve as the pressure vessel for storing cryo-compressed hydrogen, liquid hydrogen, or sub-cooled liquid hydrogen. The pressure range can be 5-100 bar, as an example. In this example, the liner could be a thick liner, with a thickness of 0.5 inches, for example, that meets the combination of properties requirements described herein. This may enable a storage vessel without a composite overwrap or some outer structural layer. This system may be used in cases such as where low pressure is required, such as underground mining operations.

In some variations, the system may include additional components as part of the storage vessel. Accordingly, a system variation may include a pressure vessel comprising a liner made of metal, the metal having one or more of the following properties described herein, and a composite overwrap. The composite overwrap may be applied over the liner. This may function to enable the pressure vessel to store cryogenic fluids at pressures exceeding 100 bar and going to 450 bar. This may also result in achieving a pressure vessel with a burst safety factor exceeding 1.5; with a cycle life that exceeds 10,000 or 20,000 when the vessel is pressure cycled between the extremes of its operating regime (pressure and temperature extremes); and/or with a benign leak-before-burst failure mode when subjected to pressure and temperature cycles.

The lightweight pressure vessel with liners made with the properties described herein may store cryo-compressed hydrogen such that the storage gravimetric density of the storage system including insulation exceeds 10 wt. %.

In some variations, the method may include the assembly or manufacturing of a storage vessel which can comprise, as part of a storage vessel, forming a liner with properties described herein, and optionally applying a composite overwrap around the liner.

The storage vessel functions as a component that directly stores contained material. In particular, the storage vessel stores $CcH_2$. The system variations for the storage vessels (e.g., the variation with a liner and composite overwrap) may, for example, store other materials, compositions, or mixtures such as compressed gas, cryogenic compressed gas, or a two-phase fluid that mixes cryogenic fluid and gas.

The storage vessel system preferably includes a defined internal cavity for cryo-compressed hydrogen fuel such that the storage vessel contains or may be used to store cryo-compressed hydrogen. The system may include one or more input and/or output lines and associated valves coupled to the storage vessels to enable supplying of fuel and/or dispensing contained fuel. In some variations, the pressure vessel is cylindrical with hemi-spherical caps, nearly hemi-spherical caps, isotensoidal caps, or otherwise domed caps.

The storage vessel may alternatively have any other shape or design attributes, as desired by implementation. For example, in some variations, the storage vessel may comprise a tank as described in PCT Patent Application No. PCT/US2023/064970, filed on 26 Mar. 2023, which is hereby incorporated in its entirety, that has a geometry that optimizes the surface area to volume ratio of the tank to leverage para-hydrogen to ortho-hydrogen conversion.

The storage vessel may be classified as a Type I without a composite overwrap, a Type II storage vessel with a partial composite overwrap, or a Type III storage vessel with a full composite overwrap. The storage vessel may be made in sizes and dimensions similar to existing storage vessels. In other variations, the storage vessel may use different sizing and/or geometry.

The liner functions as a layer forming at least an internal surface of the storage vessel. The liner material is preferably effectively inert to hydrogen. The liner material preferably inhibits hydrogen permeation out of the defined cavity of the storage vessel or other compounds that may be placed in the storage vessel.

Figure 7:
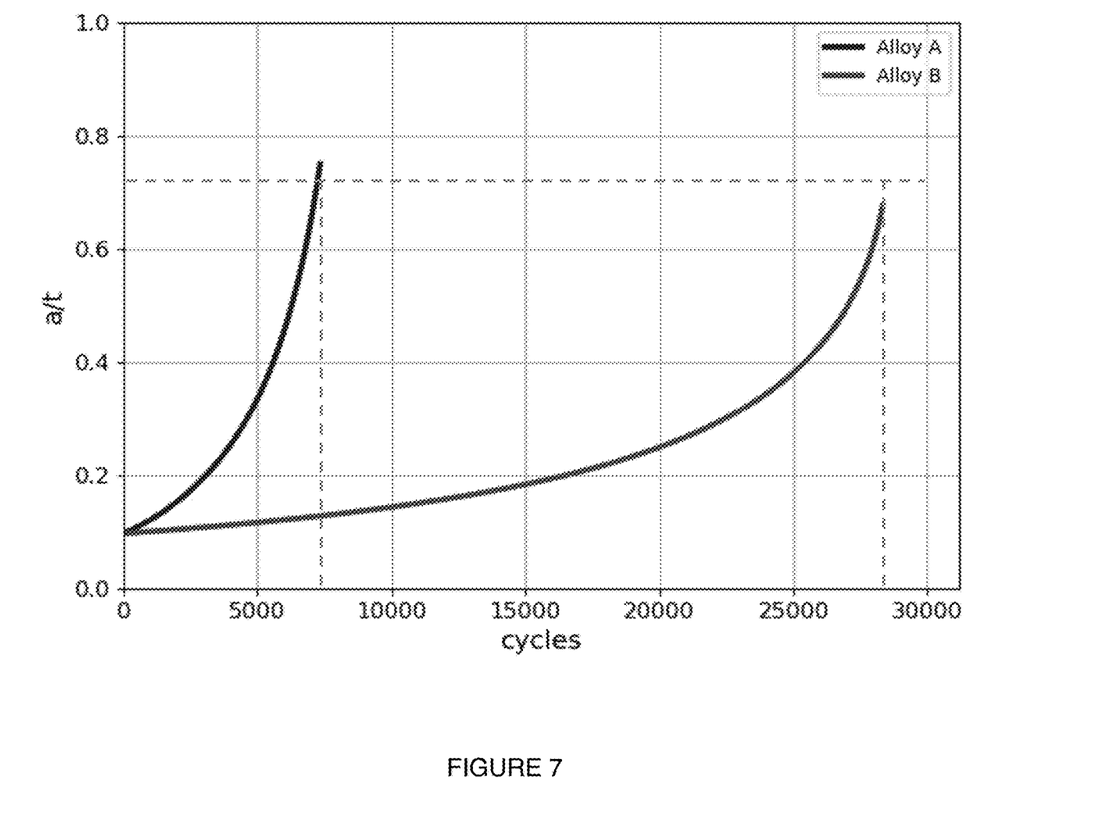
FIG. 7 is an exemplary chart showing impact of different combinations of material properties on cycle life.

The liner is preferably a load-sharing liner made of an alloy selected from the set of metals comprising: aluminum and austenitic stainless-steel alloys. Austenitic stainless steel is a type of stainless steel that primarily consists of iron, chromium, and nickel. It may provide excellent corrosion resistance and high strength at both ambient and cryogenic temperatures. Aluminum alloys primarily consist of aluminum, magnesium, silicon, zinc, and copper. There is a vast design space and collection of aluminum and stainless-steel alloys that serve as candidates for $CcH_2$ applications. The material that is optimized for cryo-compressed hydrogen may exhibit a combination of material properties above certain threshold values. In other words, an optimal or enhanced liner may be selected based on the required material properties defined here. As shown in FIG. 7, while 6061-T6 exhibits sufficient strain to failure (>15%) at cryogenic temperatures, it does not exhibit sufficient yield strength. Furthermore, the fatigue crack growth rate at relevant temperatures, such as 77 K, may be inadequate to achieve the desirable cycle life of the storage vessels. In contrast, there are other materials that meet these requirements.

The liner is preferably used as the primary material layer with a surface exposed to the contained fuel (or material) like $CcH_2$. In some variations, it may be formed to be a seamless liner exposing substantially all of the internal surface to $CcH_2$. Inlets, outlets, or monitoring systems, and/or other components may introduce non-linear surfaces exposed to the defined internal cavity. In some variations, the liner may alternatively partially make up the surfaces defining the internal cavity (e.g., less than 90%) if, for example, the domed endcaps are made of a different material.

The properties of the liner in terms of physical and material design properties may follow a set of properties.

As one potential characterizing property, in some variations the liner thickness may be between 0.05 and 0.5 inches for a vessel inner diameter between 12 and 30 inches. A specification within this range may be determined to satisfy design burst pressure, cycle life, inner diameter, gravimetric efficiency needs of the application, and/or other constraints. In one exemplary application, a cycle life may be set to enable greater than 11,0000 $CcH_2$ operating cycles.

Figure 5:
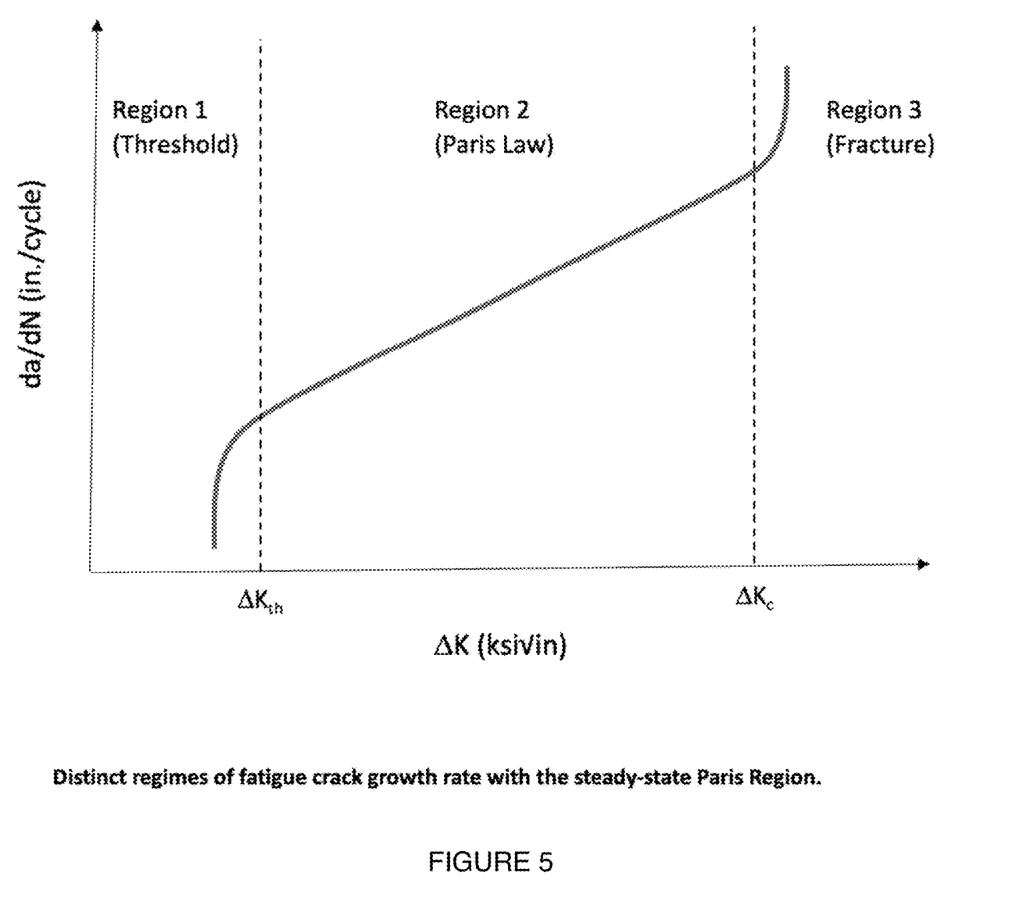
FIG. 5 is an exemplary chart showing a fatigue crack growth curve plotted following a relevant approach.

As another potential characterizing property, the liner may be made of a material exhibiting sufficiently low fatigue crack growth rates. Fatigue crack growth rate describes the rate at which a pre-existing crack in a material grows over a specified number of cycles, typically in units of inches/cycle. In the context of fatigue crack growth, crack propagation can be classified into different regimes based on the stress intensity factor range, also known as $\Delta K$ in units ksi$\sqrt{}$in. Regime 2 (a.k.a., linear elastic fatigue crack growth regime) refers to the range of stress intensity where the crack advances predictably, with the crack growth rate being (substantially) linearly proportional to the stress intensity on a logarithmic scale as shown in FIG. 5. In some variations, the liner may be made of material with the fatigue crack growth rate, or the exponent of the Paris Law for fatigue crack growth rate, less than 3.25 the region 2 at 77 K between the stress intensity factor range between 3 ksi$\sqrt{}$in and 30 ksi$\sqrt{}$in. The temperature 77K is a low temperature representative of cryogenic conditions relevant to cryo-compressed hydrogen storage.

It may additionally be desirable to have the elastic modulus of liner material be lower than the elastic modulus of the carbon fiber composite overwrap. The latter is a function of the elastic modulus of the carbon fiber as well as the laminate construction of the overwrap. The elastic modulus of carbon fiber, which is high strength and typically employed in construction of composite pressure vessels, can vary between 30E6 and 45E6 psi. The elastic modulus of the unidirectional composite made with carbon fiber and epoxy resin depends on the volume fraction of the carbon fiber and can vary between 15E6 psi and 30E6 psi. The elastic modulus of the composite overwrap is a function of the properties of the unidirectional composite and the laminate orientation used in the filament wound construction. A key material property that influences the fatigue crack growth in the cylindrical section of the liner is the circumferential modulus of the composite overwrap, which can vary between 15E6 psi and 25E6 psi depending on the laminate construction of the overwrap. Therefore, the metallic liner may be a material with an elastic modulus between less than 15E6 psi at 77 K.

If a liner material (such as stainless steel) has an elastic modulus higher than that of the composite overwrap in the circumferential direction, it is difficult to induce a requisite residual compressive stress in the liner using the autofrettage technique for the required $CcH_2$ cycle life. In addition, such a liner material also carries a higher fraction of the stress when the composite overwrapped pressure vessel is subjected to internal pressure during its operation, thereby subjecting the liner to a high tensile stress that results in either plastic deformation of the liner or a higher rate of fatigue crack growth through the pressure cycles.

As another potential characterizing property, the liner may be made of a material with a yield strength of greater or equal to 50 ksi at 77K. The tensile yield strength of the liner material influences the degree of residual compressive hoop stress that can be imparted to the liner at zero pressure following autofrettage. The higher the residual compressive stress (e.g., at zero pressure), the lower is the maximum tensile hoop stress under maximum operating pressure, the lower the effective stress intensity factor range ($\Delta K$) that the crack in the liner is subjected to and consequently the less is the fatigue crack growth in the liner during the $CcH_2$ cycles. According to preliminary analysis, a tensile yield strength above 50 ksi is a key characteristic to achieve 10,000+ cycles under $CcH_2$ environment for an aluminum lined Type III storage vessel.

As another potential characterizing property, the liner may be made of a material with a strain to failure, $\varepsilon u$, greater than 12% at 77 K. This requirement indicates that the material should be capable of withstanding significant deformation (12% or more) before reaching ultimate failure under cryogenic conditions.

As another potential characterizing property, the liner may exhibit a plain strain fracture toughness ($K_{IC}$) greater than 30 ksi√in at 77 K.

As another potential characterizing property, the liner may include or be made of a material with a microstructure that assures uniform, fine equiaxed grains resulting from specialized processing and heat treatment. "Uniform" is used to characterize the material properties where the grains have a consistent size and distribution throughout the material. This uniformity may help ensure the material's mechanical properties are more consistent and predictable. "Equiaxed" is used to characterize the material properties related to grain morphology where the grains have similar sizes in all dimensions, appearing as roughly spherical or cube-like shapes. In contrast, elongated or columnar grains have a preferred direction of growth. Equiaxed grains provide more isotropic properties in the material, meaning the mechanical properties are more consistent in all directions. The attainment of uniform, equiaxed grains is influenced by the processing and heat treatment of the material. Appropriate processing techniques, such as controlled cooling or solidification, can promote the formation of equiaxed grains. Additionally, the application of specific heat treatment cycles can further refine the microstructure, leading to more uniform and desirable grain characteristics.

As another potential characterizing property, the liner may have an alloy density of <0.1 lb/in^3. This may function to ensure the gravimetric efficiency of the storage system is sufficiently high for storing hydrogen.

Figure 6:
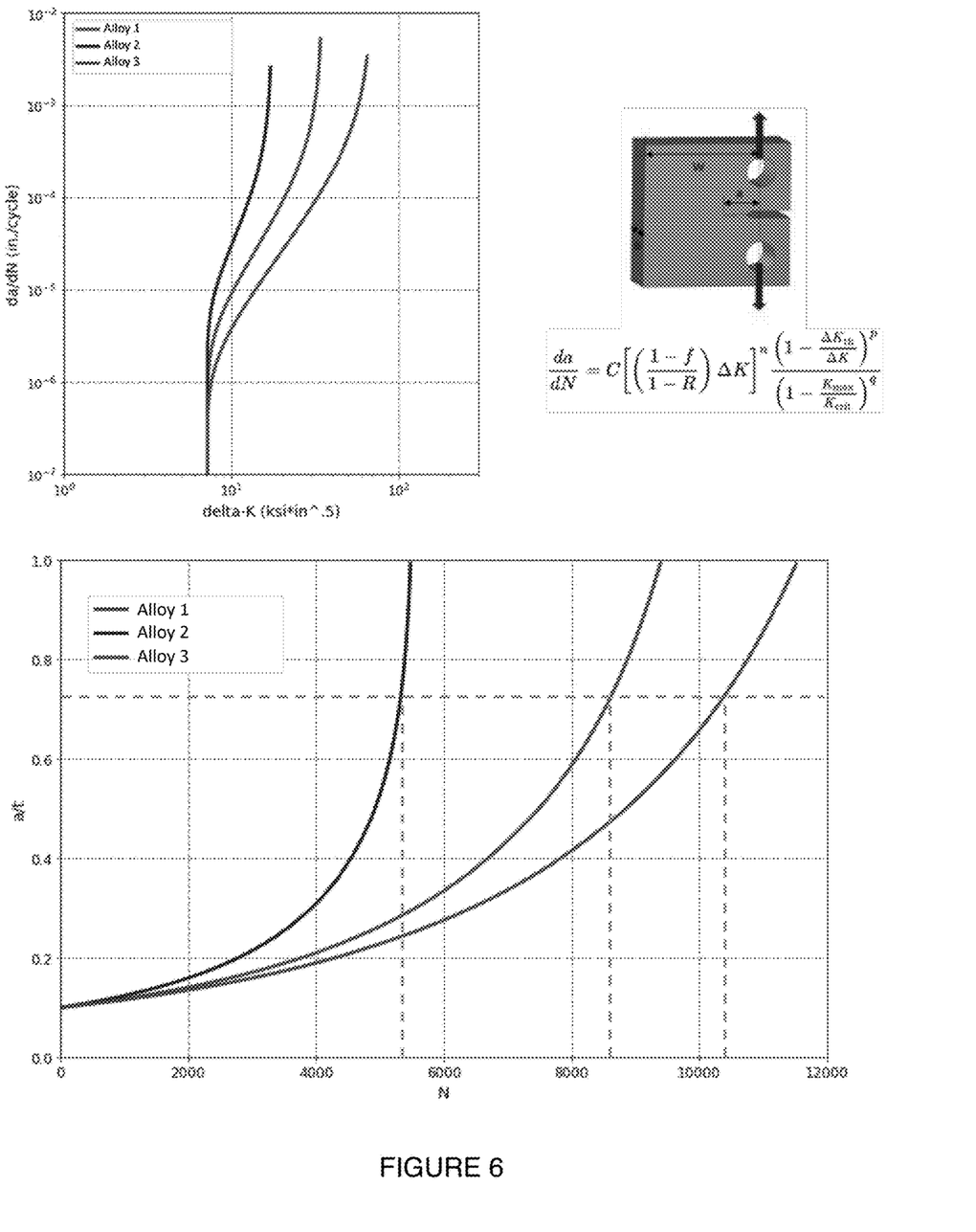
FIG. 6 is an exemplary chart and diagram for three alloys with different FCGR values, showing the method and mathematical depiction of calculating the FCGR, and an exemplary chart comparing cycle life of the three example alloys.
Figure 8:
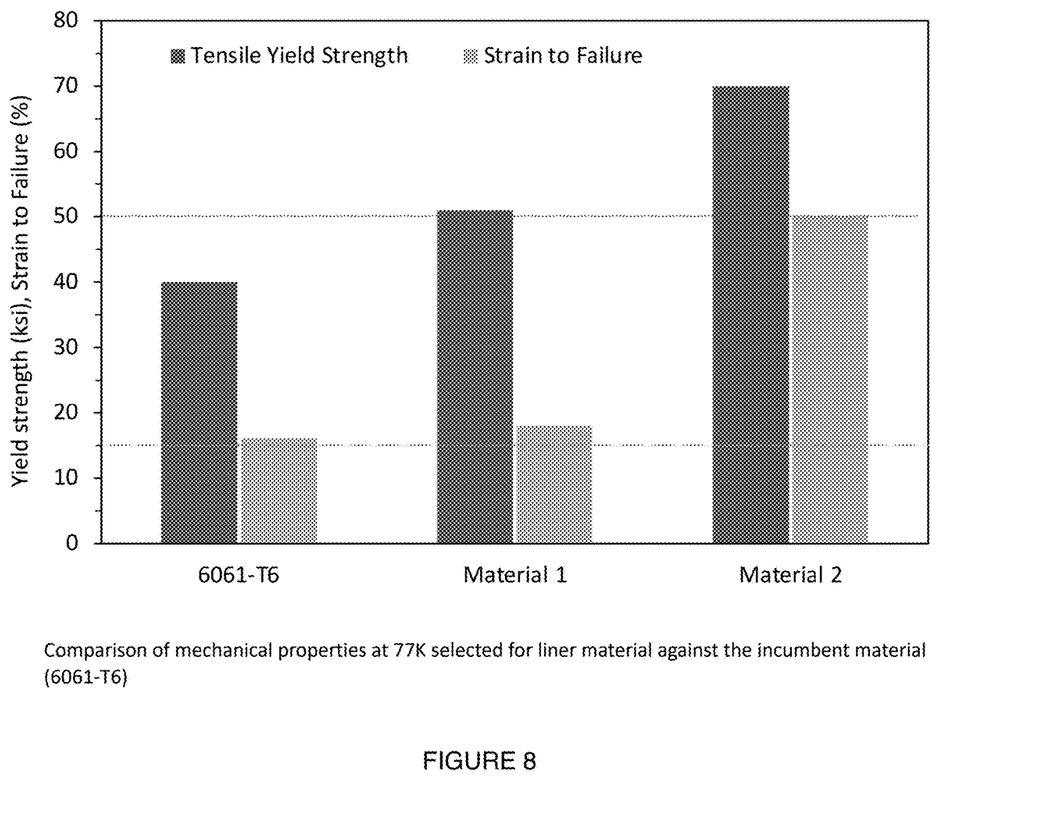
FIG. 8 is an exemplar comparative chart of 6061-T6 aluminum to specially selected materials.

In some variations, unique combinations of properties may be used. In some cases, the fatigue crack growth rate (FCGR) improvement may not be sufficient (e.g., an example is shown in FIG. 6), but a combination of material properties (e.g., of the preferred alloys) can improve overall performance (e.g., an example is shown in FIG. 7). Some exemplary combinations of material combinations are highlighted in FIG. 8.

Figure 9:
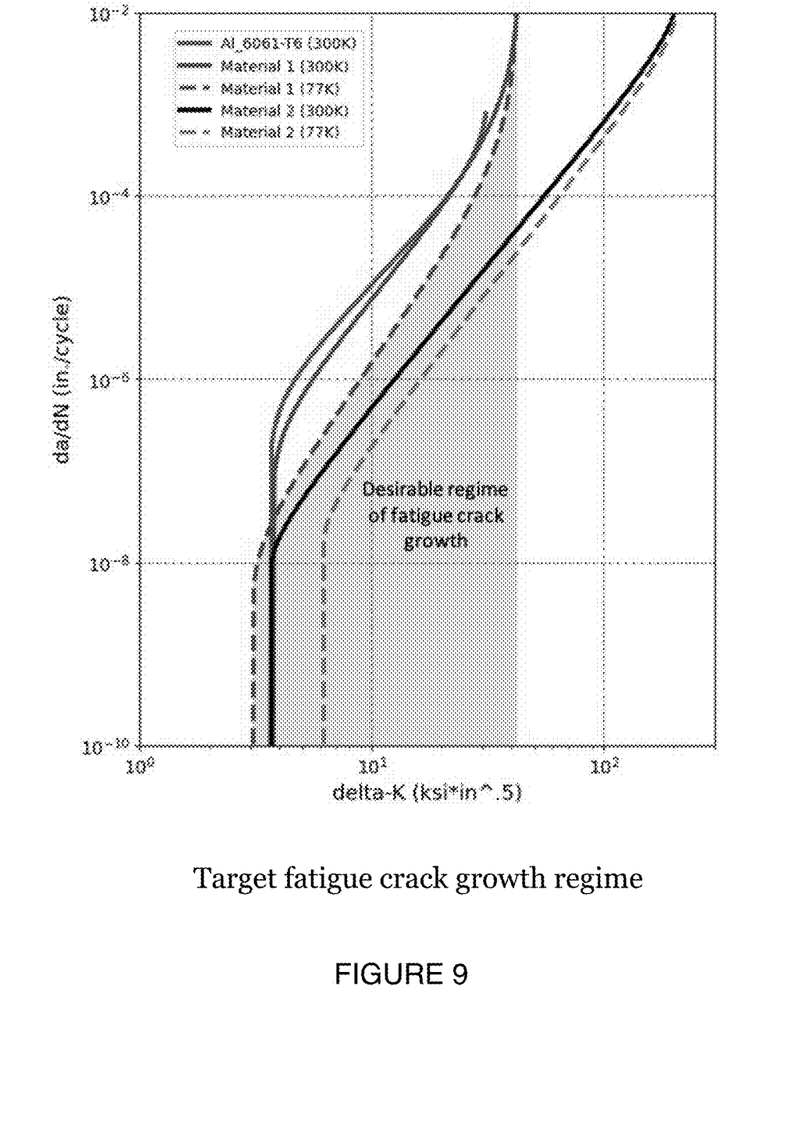
FIG. 9 is a diagram showing a desirable regime of fatigue crack growth.

The performance of the storage system under $CcH_2$ conditions may be strongly dependent on the material properties of the liner. The higher performing liners may meet the described material property requirements for a combination of properties. As illustrated with FIGS. 4 and 5, a notable improvement in just the fatigue crack growth rate has a less pronounced effect than expected on the cycling life during $CcH_2$ operations. In other words, a notable improvement in one property, even one as relevant as the fatigue crack growth rate, is not sufficient for the desired $CcH_2$ performance. A certain threshold needs to be met for a combination of properties. For example, seemingly minor improvements for a combination of material properties can deliver an outsized impact in $CcH_2$ operations durability, as shown in FIG. 6. As these properties are dependent on each other, and a non-linear relationship governs their impact on liner performance, slight improvements for a select group of material properties compound greatly to deliver outstanding $CcH_2$ performance. As shown in FIG. 9, Material 1 has slightly improved Tensile Yield Strength and Strain to Failure relative to 6061-T6. If such a material also meets the fatigue crack growth rate requirement, then such a material can have an outsized improvement in cycle life. In particular, a material that meets the criteria for fatigue crack growth rage, yield strength, and strain to failure, will exhibit the desired $CcH_2$ operating capabilities. It may not need to greatly surpass any of the thresholds, and rather it may just barely meet them-so long as it preferably does so for the combination of properties.

By applying the developed damage-tolerant methodology, coupled with empirical results, we have discovered these requirements and their unique dependencies. Further, we have found the alloys that are able to meet the pressure and thermal requirements of $CcH_2$ operations. By implementing such a material as the liner, durable $CcH_2$ storage systems are possible and can be used for heavy-duty applications, such as heavy-duty trucking.

The composite overwrap functions to provide structural reinforcement of the liner. The composite overwrap may further function in cooperation with the liner design to mitigate crack propagation in the liner. Therefore, the liner and the composite overwrap may be considered as an integrated functioning unit and the properties of the combined structure influence the fatigue life of the storage vessel. The design of the composite overwrap includes consideration of providing strength in both the hoop and axial direction to achieve an adequate burst safety factor. The composite overwrap can provide requisite stiffness in the circumferential direction to limit the stresses responsible for fatigue crack growth in the liner. Thus, it can be advantageous to limit degradation of the structural performance in the composite to mitigate the fatigue crack growth in the liner, which in turn may improve the cycle life of the pressure vessel.

The composite overwrap may be designed to limit the expansion and hoop strain in the liner such that the fatigue life of the resulting storage vessel is capable of greater or equal to 10,000, or even 20,000 cycles, when the vessel is cycled between the extremes of both pressure and temperature during its operating regime. The composite material may include purposefully selected reinforcement fiber (carbon, glass, Kevlar etc.) and thermoset matrix (epoxy, vinyl ester, cyanate ester) or thermoplastic matrix (polyethylene, PA6, PA66, PEEK, etc.) in which the selection of materials may target various material properties such as: promoting improved factor of safety in burst at $LN_2$ temperature (77K) compared to ambient temperature (300K); inhibiting progressive microcracking of the composite material during cycles between the pressure and temperature extremes needed for the operating conditions of the $CcH_2$ storage application; and/or reducing the differential strain experienced by the liner material during fatigue cycles, thereby prolonging its life to leak-before-burst failure.

In one variation, the composite thickness and the ply sequence of the composite overwrap may be adjusted and/or optimized to enhance the fatigue life of the liner and thereby the composite overwrapped pressure vessel (COPV). This may minimize the expansion of the liner under $CcH_2$ operating conditions.

Based on the optimized liner properties, the composite overwrap may be designed to satisfy one or more modeled properties. Below are sample characterizing properties calibrated to potential liner thicknesses discussed herein, which may be usable for $CcH_2$ applications.

As a potential characterizing property of the composite overwrap, the composite overwrap may have a thickness of between 0.125 inches to 2 inches.

As another potential characterizing property of the composite overwrap, the composite overwrap may have an elastic modulus of carbon fiber >30E6 psi.

As another potential characterizing property of the composite overwrap, the strain to failure of (unidirectional) carbon fiber composite material used in the composite overwrap may be equal or greater than 1.5%.

As another potential characterizing property of the composite overwrap, the volume fraction of carbon fiber in the composite may be equal or greater than 50%.

As another potential characterizing property of the composite overwrap, the composite overwrap may have a stress ratio equal or greater than 2.25. The stress ratio may be characterized by the minimum ultimate strength of the fiber, as determined in pressure vessel burst tests, divided by the stress in the fiber at the nominal working pressure.

Alternative embodiments implement the above methods and/or processing modules in non-transitory computer-readable media, storing computer-readable instructions. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUs, TPUS, microprocessors, or ASICs, but the instructions can alternatively or additionally be executed by any suitable dedicated hardware device.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A cryo-compression vessel comprising:
    an insulation layer; and
    a composite overwrapped pressure vessel (COPV) encapsulated within the insulation layer and at least partially separated from the insulation layer by an interstitial gas chamber, the COPV comprising:
        a liner comprising a cylinder with a pair of ellipsoidal end caps formed as a unitary body from a metal alloy, the metal alloy comprising: greater than 92.0% aluminum by mass, greater than 2.0% copper by mass, greater than 0.2% manganese by mass, and less than 0.6% magnesium by mass; and
        a composite overwrap structure encapsulating the metal liner,
    wherein the COPV houses cryo-compressed hydrogen at a pressure above 100 bar and at a cryogenic temperature.

2. The cryo-compression vessel of claim 1, wherein the metal alloy comprises: between 92.0% and 96.8% aluminum by mass, between 2.0% and 6.5% copper by mass, and between 0.2% and 0.5% manganese by mass.

3. The cryo-compression vessel of claim 2, wherein the metal alloy comprises between 3.2% and 6.3% copper by mass.

4. The cryo-compression vessel of claim 3, wherein the metal alloy comprises between 0.2% and 0.6% magnesium by mass.

5. The cryo-compression vessel of claim 1, wherein the metal alloy comprises between 0.2% and 0.5% manganese by mass.

6. The cryo-compression vessel of claim 1, wherein the metal alloy is a non-weldable aluminum-copper alloy.

7. The cryo-compression vessel of claim 1, wherein the composite overwrap structure comprises carbon fiber.

8. The cryo-compression vessel of claim 7, wherein composite overwrap structure defines a first thickness between 0.125 inches and 2 inches, wherein the liner defines a second thickness between 0.05 inches and 0.5 inches.

9. The cryo-compression vessel of claim 7, wherein, at 77 Kelvin, an elastic modulus of the liner is less than an elastic modulus of the composite overwrap structure.

10. The cryo-compression vessel of claim 1, wherein the COPV is configured to house hydrogen gas at 350 bar with the interstitial gas chamber at a vacuum pressure.

11. The cryo-compression vessel of claim 1, wherein the unitary body comprises a cylinder with a pair of domed ends, wherein the cylinder comprises a Length-over-Diameter (L/D) ratio between 1.5 and 5.

12. The cryo-compression vessel of claim 1, wherein the liner is fluidly coupled to a pressurized interior of the COPV.

13. The cryo-compression vessel of claim 1, wherein the insulation layer comprises a structural enclosure and is substantially rigid, wherein the COPV is mechanically coupled to the structural enclosure.

14. The cryo-compression vessel of claim 1, wherein the unitary body is spin formed or flow formed.

15. A composite overwrapped pressure vessel (COPV) for storing cry-compressed hydrogen, the COPV comprising:
    a liner formed as a unitary body from an alloy, the alloy comprising: between 92.0% and 96.8% aluminum by mass, between 2.0% and 6.5% copper by mass, between 0.2% and 0.5% manganese by mass, wherein the alloy defines a fatigue crack growth rate exponent defined at 77 Kelvin of less than 3.25 inches per cycle within a linear elastic fatigue crack growth regime; and
    a composite overwrap surrounding the liner.

16. The COPV of claim 15, wherein the alloy further comprises magnesium.

17. The COPV of claim 15, wherein the linear elastic fatigue crack growth regime is between the stress intensity factor (K) range defined by: 3 ksi$\sqrt{\text{in}}$<$\Delta$K<30 ksi$\sqrt{\text{in}}$.

18. The COPV of claim 15, wherein the alloy defines a yield strength above 50 ksi, and a strain to failure above 15 percent.

19. The COPV of claim 15, wherein the alloy is pre-treated by a T6 Heat Treatment Process.

20. The COPV of claim 15, wherein the COPV defines a pair of necks at opposing ends of the COPV, wherein for each neck of the pair of necks, a respective mount supports the COPV at the respective neck.

* * * * *